United States Patent [19]

Pollich et al.

[11] Patent Number: 4,993,275
[45] Date of Patent: Feb. 19, 1991

[54] CAM MECHANISM FOR PERIODICALLY SWIVELING A SWIVEL DEVICE

[75] Inventors: Gerhard Pollich, Heidelberg; Norbert Thünker, Hirschberg; Roland Lorenz, Heidelberg, all of Fed. Rep. of Germany

[73] Assignee: Heidelberger Druckmaschinen AG, Heidelberg, Fed. Rep. of Germany

[21] Appl. No.: 405,570

[22] Filed: Sep. 11, 1989

[30] Foreign Application Priority Data

Sep. 12, 1988 [DE] Fed. Rep. of Germany ....... 3830946

[51] Int. Cl.⁵ .............................................. F16H 53/08
[52] U.S. Cl. ......................................... 74/54; 74/569
[58] Field of Search ............................ 74/54, 567, 569

[56] References Cited

U.S. PATENT DOCUMENTS

| | | | |
|---|---|---|---|
| 978,783 | 12/1910 | Rose | 74/54 |
| 1,227,812 | 5/1917 | MacPherson | 74/569 X |
| 2,426,036 | 8/1947 | Lyham | 74/54 X |
| 3,116,923 | 1/1964 | Gunther | 74/54 X |
| 4,301,696 | 11/1981 | Andersson | 74/569 X |
| 4,583,728 | 4/1986 | Mathes | 74/54 X |

FOREIGN PATENT DOCUMENTS

| | | | |
|---|---|---|---|
| 677130 | 12/1932 | Fed. Rep. of Germany . | |
| 3329122 | 2/1985 | Fed. Rep. of Germany | 74/54 |
| 1101917 | 10/1955 | France | 74/569 |
| 229142 | 2/1969 | U.S.S.R. | 74/54 |

OTHER PUBLICATIONS

German Reference Feinwerktechnik+Micronic, 78, 1974 Book 1 (J. Peczkowski) "Kurvenscheibengtriebe", pp. 29-35; the entire document is pertinent.

Primary Examiner—Allan D. Herrmann
Attorney, Agent, or Firm—Herbert L. Lerner; Laurence A. Greenberg

[57] ABSTRACT

A cam mechanism for periodically swiveling a swivel device includes a rotatable first cam disk carrying a first cam serving as a main cam, a rotatable second cam disk carrying a second cam serving as an auxiliary cam, a first roller engaging the first cam under spring force and rollable on the first cam during rotation of the first cam disk, a second roller engaging the second cam under spring force and rollable on the second cam during rotation of the second cam disk, and a lever arrangement swivelable by the two rollers and having at least one spring for providing the spring force, including a swivel lever swivelable about a swivel axis and carrying the first roller, a swiveling movement corresponding to the first cam being impresable by the swivel lever upon the swivel device, the swivel axis and the two rollers having axes of rotation extending parallel to one another, and normals to the axes of rotation of the two rollers intersecting one another on the axis of rotation of the swivel axis and forming and angle $\alpha$ which is a measure for the spring force under which the two rollers engage the two cams, the auxiliary cam having a contour for varying the angle $\alpha$ as a function of inertial forces resulting, respectively, from accelerations and decelerations of the lever arrangement and of machine parts connected therewith during rotation of the two cam disks.

5 Claims, 4 Drawing Sheets

CAM MECHANISM FOR PERIODICALLY SWIVELING A SWIVEL DEVICE

The invention relates to a cam mechanism for periodically swiveling a swivel device e.g a pre-gripper device of a sheet-fed rotary printing machine and, more particularly, to such a cam mechanism including a first cam disk carrying a first cam serving as a main cam, a second cam disk carrying a second cam serving as an auxiliary cam, a first roller engaging the first cam under spring force and rolling on the first cam during rotation of the first cam disk, a second roller engaging the second cam during rotation of the second cam disk, and a lever arrangement swivelable by means of the two rollers and having at least one spring for providing the spring force, the lever arrangement including a swivel lever swivelable about a swivel axis and carrying the first roller, the swivel lever impressing upon the swivel device a swiveling movement corresponding to the first cam, the swivel axis and the two rollers having axes of rotation extending parallel to one another, and normals to the axes of rotation of the two rollers intersecting one another on the axis of rotation of the swivel axis and forming an angle which is a measure for the spring force under which the two rollers engage the two cams.

German Patent No. 677 130 describes a pre-gripper control for a sheet-fed rotary printing machine having the aforementioned features. The main cam and the auxiliary cam are formed analogously to one another so that the spring bracing the two roller levers towards one another always maintains practically the same length. This is achieved by the fact that the angle enclosed by the two roller levers remains constant, regardless of the respective operating condition, the aim being that the contact force of the roller lever which acts on the main cam be constant. This publication does, in fact, mention that, as a result of the magnitude of the masses which are made up of the individual masses of the pre-grippers and which are to be accelerated and decelerated respectively in accordance with the course of the main cam, this contact force is subjected to changes, which may cause vibrations of the machine However, the conventional device described therein only avoids the relatively large fluctuations of the contact force of a roller which, with earlier devices, was pressed against a cam disk by means of a lever which is spring-biased against the machine frame, the relatively large spring deflections produced by the cam disk being the cause of the relatively large fluctuations in the contact force. This conventional device is not able, however, to counteract the changes in the inertial forces resulting from the accelerations of the roller at the main cam, the appertaining roller lever and the machine parts moved by the roller lever.

For conventional cam disks it is required that these inertial forces be effective either in one and the same direction or in opposite direction or even alternating in multiples in one and the same direction and in opposite direction with respect to the spring force. Impermissibly high surface pressures may be caused thereby as a result of too great a contact force of the rollers, and impermissibly high vibrations as a result of too small a contact force of the rollers acting upon the cam disks, the surface pressures and the vibrations having similar wear and tear effects.

It is accordingly an object of the invention to provide a cam mechanism of the aforementioned general type which avoids both excessive contact forces of the rollers and vibrations caused by temporarily small contact forces of the rollers.

With the foregoing and other objects in view, there is provided, in accordance with the invention, a cam mechanism for periodically swiveling a swivel device, a rotatable first cam disk carrying a first cam serving as a main cam, a rotatable second cam disk carrying a second cam serving as an auxiliary cam, a first roller engaging the first cam under spring force and rollable on the first cam during rotation of the first cam disk, a second roller engaging the second cam under spring force and rollable on the second cam during rotation of the second cam disk, and a lever arrangement swivelable by the two rollers and having at least one spring for providing the spring force, including a swivel lever swivelable about a swivel axis and carrying the first roller, a swiveling movement corresponding to the first cam being impressable by the swivel lever upon the swivel device, the swivel axis and the two rollers having axes of rotation extending parallel to one another, and normals to the axes of rotation of the two rollers intersecting one another on the axis of rotation of the swivel axis and forming an angle $\alpha$ which is a measure for the spring force under which the two rollers engage the two cams, the auxiliary cam having a contour for varying the angle $\alpha$ as a function of inertial forces resulting, respectively, from accelerations and decelerations of the lever arrangement and of machine parts connected therewith during rotation of the two cam disks.

In accordance with an added feature of the invention, the contour of the auxiliary cam is shaped so as to vary the angle $\alpha$ in the sense of a constant contact force of the first roller on the first cam disk while being rotated.

In accordance with an additional feature of the invention, there is provided, in a region corresponding to the main cam, wherein the contact force of the first roller exceeds the spring force as a result of an acceleration of the first roller and of the machine parts connected therewith caused by the main cam, the auxiliary cam has a contour reducing the spring force.

In accordance with a further feature of the invention, there is provided, in a region, corresponding to the main cam, wherein the contact force of the first roller exceeds the spring force as a result of an acceleration of the first roller and of the machine parts connected therewith caused by the main cam, the contour of the auxiliary cam is radially reduced by such an amount that a reduction of the spring force related thereto compensates for substantially an acceleration-caused portion of the contact force.

In accordance with another feature of the invention, the second roller is rotatably disposed on a free end of a bending spring bar, the spring bar having another end secured under pretension force to a hub of the swivel lever, the hub embracing the swivel axis.

In accordance with a concomitant feature of the invention, in combination with the swiveling device, and wherein the swiveling device is a pregripper of a sheet-fed rotary printing machine.

The course of the auxiliary cam of the invention is corrected, in contrast with a conventional construction which has as its purpose the maintenance of a constant angle between the two roller levers. Depending upon the anticipated direction of action and the magnitude of the inertial forces resulting from the acceleration and deceleration, respectively, of the roller and the components connected with the roller, the auxiliary cam is constructed so as to have a course or path which is correspondingly corrected, as is explained hereinafter with reference to the drawing. This corrected course of the auxiliary cam reduces or enlarges the angle between the roller lever of the roller engaging the main cam and the roller lever of the roller engaging the auxiliary cam so that the spring tension between the two roller levers is also changed Due to the fact that the course of the auxiliary cam is more deeply lying so that the auxiliary cam surface has a smaller spacing from the axis of rotation of the auxiliary cam, a change in the angle between the two roller levers in the form of a reduction of the spring force may be achieved if inertial forces, which act upon the main cam, and the spring force are added together. By reducing the spring force, it is possible to reduce the greater contact force of the roller acting on the main cam and resulting from the inertial forces. Conversely, when the course of the auxiliary cam is disposed higher with respect to the axis of rotation of the auxiliary cam, it is possible to reinforce the spring force, if the inertial forces lead to a reduction of the contact force of the roller acting on the main cam, so that the contact force of the rollers can be compensated for by increasing the spring force.

The corrections to be made at the auxiliary cam would then be determined without experimentation in accordance with the inertial forces ascertained for the respective operating conditions.

Other features which are considered as characteristic for the invention are set forth in the appended claims.

Although the invention is illustrated and described herein as embodied in a cam mechanism for periodically swiveling a swivel device, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which.

Figure 1:
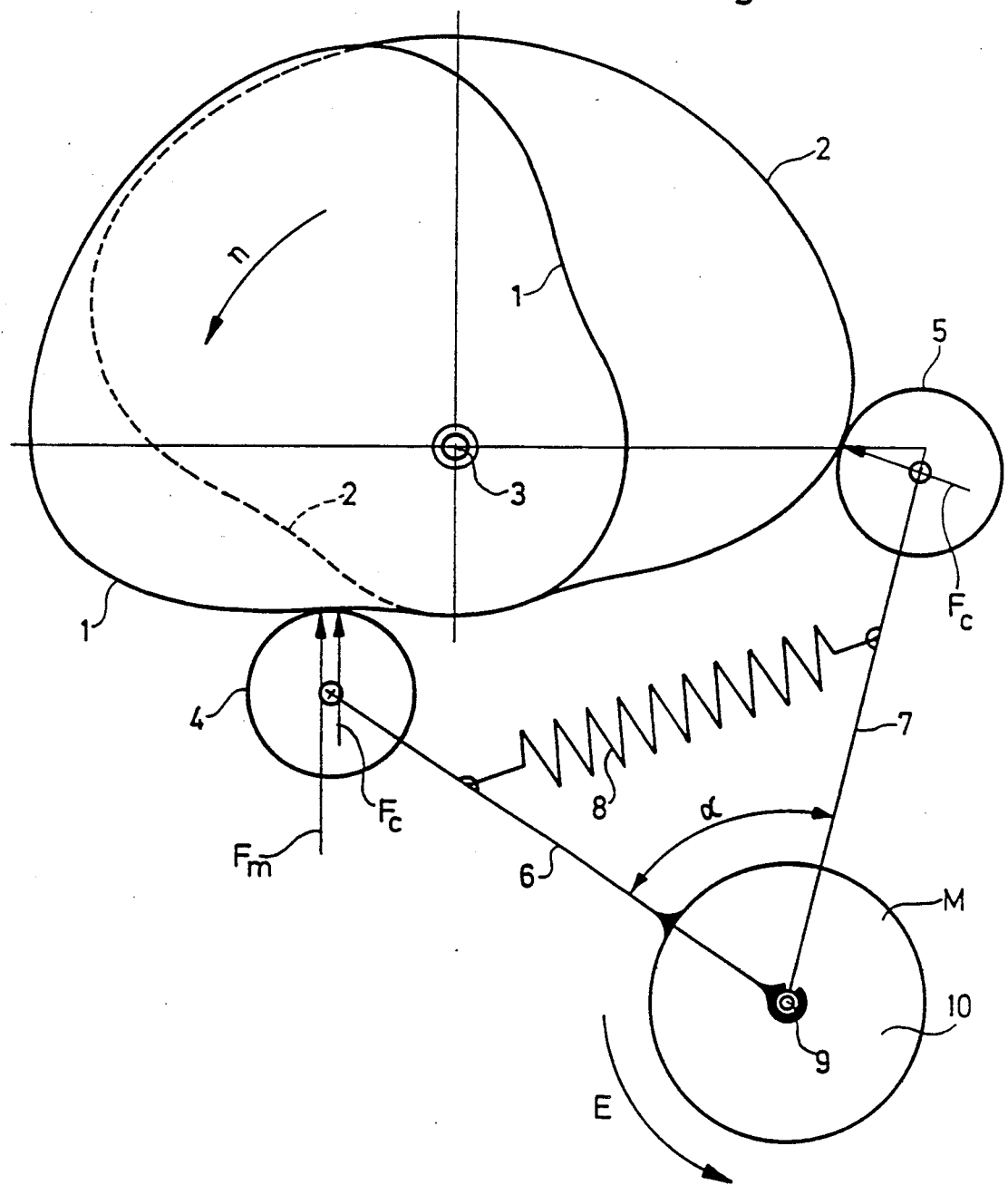
FIG. 1 is a diagrammatic view of an embodiment of a cam mechanism according to the invention having a main cam disk and an auxiliary cam disk with a common axis of rotation, and shown in an acceleration phase.
Figure 3:
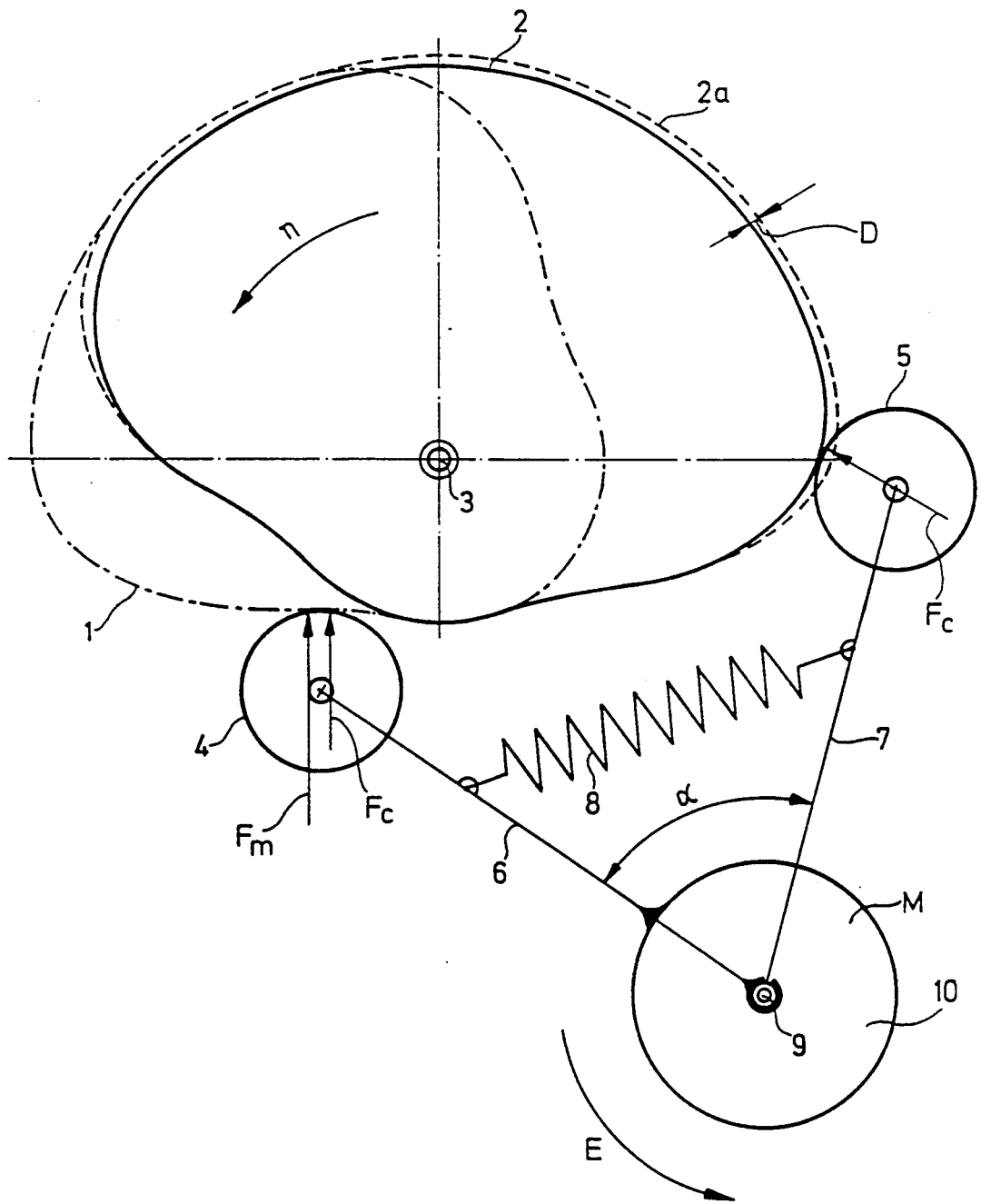
Figure 4:
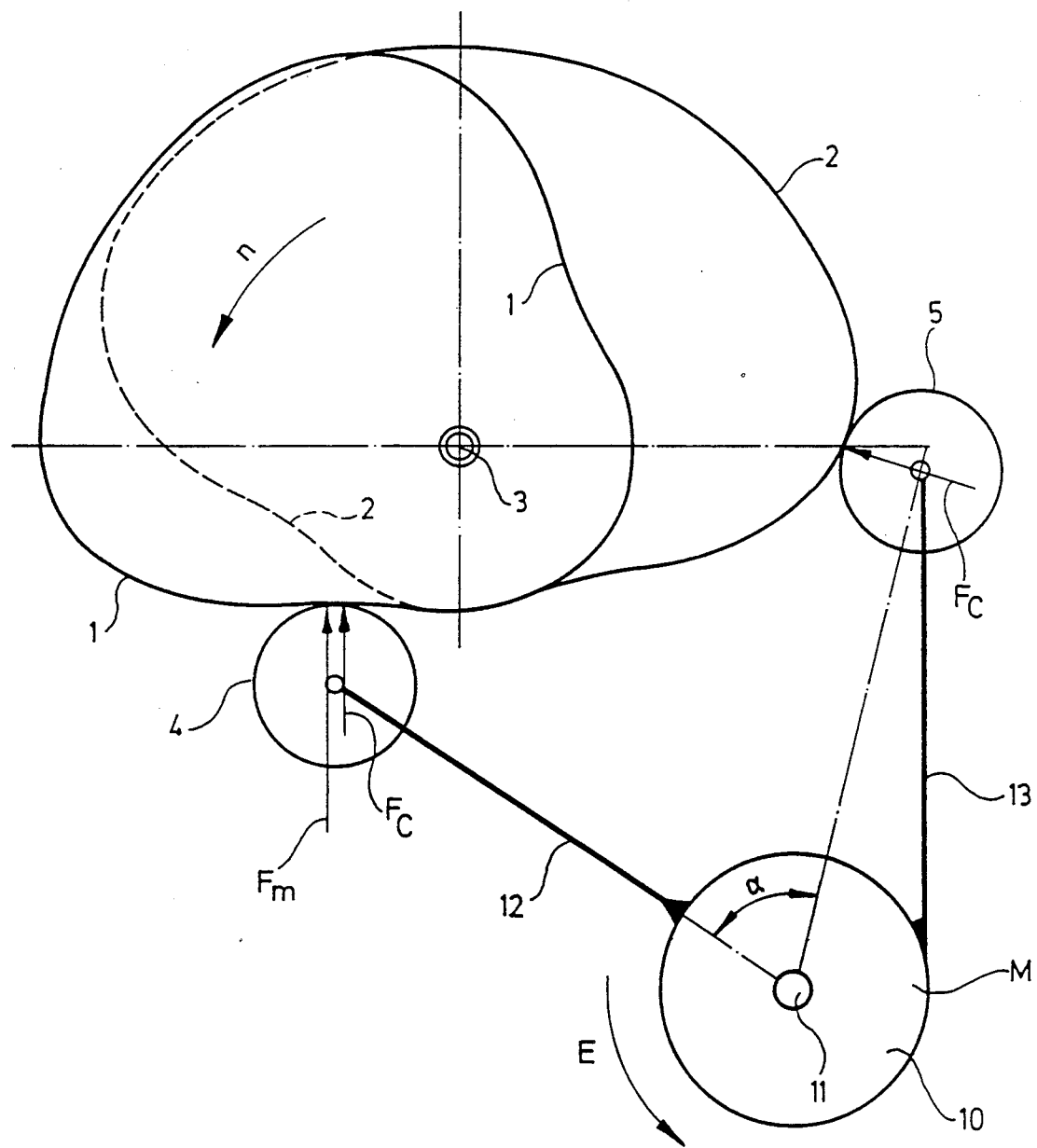

FIG. 3 is a further view of FIG. 1 showing in broken lines the course of an uncorrected portion of the contour or outline of the auxiliary cam in comparison with a corrected portion; and FIG. 4 is a diagrammatic view corresponding to that of FIG. 1 of another embodiment of the cam mechanism which differs from that of FIG. 1 by the fact that the spring force is produced by means of a bending spring bar.

Referring now to the drawing and, first, particularly, to FIG. 1 thereof, there is shown therein a cam mechanism according to the invention which includes cam disks carrying a main cam 1 and an auxiliary cam 2 and located on a common axis of rotation 3 so that they rotate jointly at the speed n in the direction of rotation indicated by the associated curved arrow. A roller 4 which is mounted on the free end of a roller lever 6 so as to be freely rotatable thereon is braced against the main cam 1. A roller 5 which is mounted on the free end of a roller lever 7 so as also to be freely rotatable thereon is braced against the auxiliary cam 2. Both roller levers 6 and 7 are swivel-mounted on a common swivel axis 9 and are movable independently of each other. Between the roller levers 6 and 7, a tension spring 8 is arranged so that both roller levers 6 and 7 are stressed or braced towards one another, and the two rollers 4 and 5 of the roller levers 6 and 7 engage the two cams (the main cam 1 and the auxiliary cam 2) under a spring force Fc. Components of a gripper drive e.g. a swing gripper drive (non-illustrated) are connected directly to the roller lever 6 of the roller 4 which engages the main cam 1. The mass formed from the non-illustrated gripper drive components as well as the masses of the roller lever 6 and the roller 4 may be imaginatively combined with the mass of a hub 10 which is connected to the roller lever 6 so as to be fixed against rotation relative thereto, thereby form a composite mass M. During rotation of the two cams 1 and 2 this mass M produces inertial forces Fm acting upon the roller 4 which, depending upon the direction of cam-caused acceleration and deceleration, respectively, of the roller 4, are directed towards the main cam 1 and away therefrom, respectively.

In an acceleration phase illustrated in FIG. 1, the inertial force Fm resulting from the mass M acts on the main cam 1, in the direction of a normal to the main cam 1 and in the same direction as a spring force Fc directed in parallel therewith which is produced by the spring 8 located between the two roller levers 6 and 7, so that an increase in the contact force of the roller 4 upon the main cam 1 would occur without taking any further measures. In the embodiment of FIG. 1 this increase is compensated for, in accordance with the invention, by the fact that the roller lever 7 approaches the roller lever 6 in the sense of a reduction in the angle α formed between the two roller levers 6 and 7, thereby reducing the spring force Fc This is achieved by correcting the course of the auxiliary cam 2 in that region which corresponds to a region of the main cam 1, wherein the mass M is subjected to an angular acceleration E in the direction of the associated curved arrow shown in FIGS. 1, 3 and 4. In its corrected region, as compared to an uncorrected course 2a (FIG. 3), the auxiliary cam 2 is reduced radially by a dimension D. Due to the reduction of the spring force Fc related thereto, an acceleration-caused portion of the contact force of the roller 4 can be compensated for. The corresponding region of an uncorrected course 2a of the auxiliary cam 2 is represented by a broken line in FIG. 3.

Figure 2:
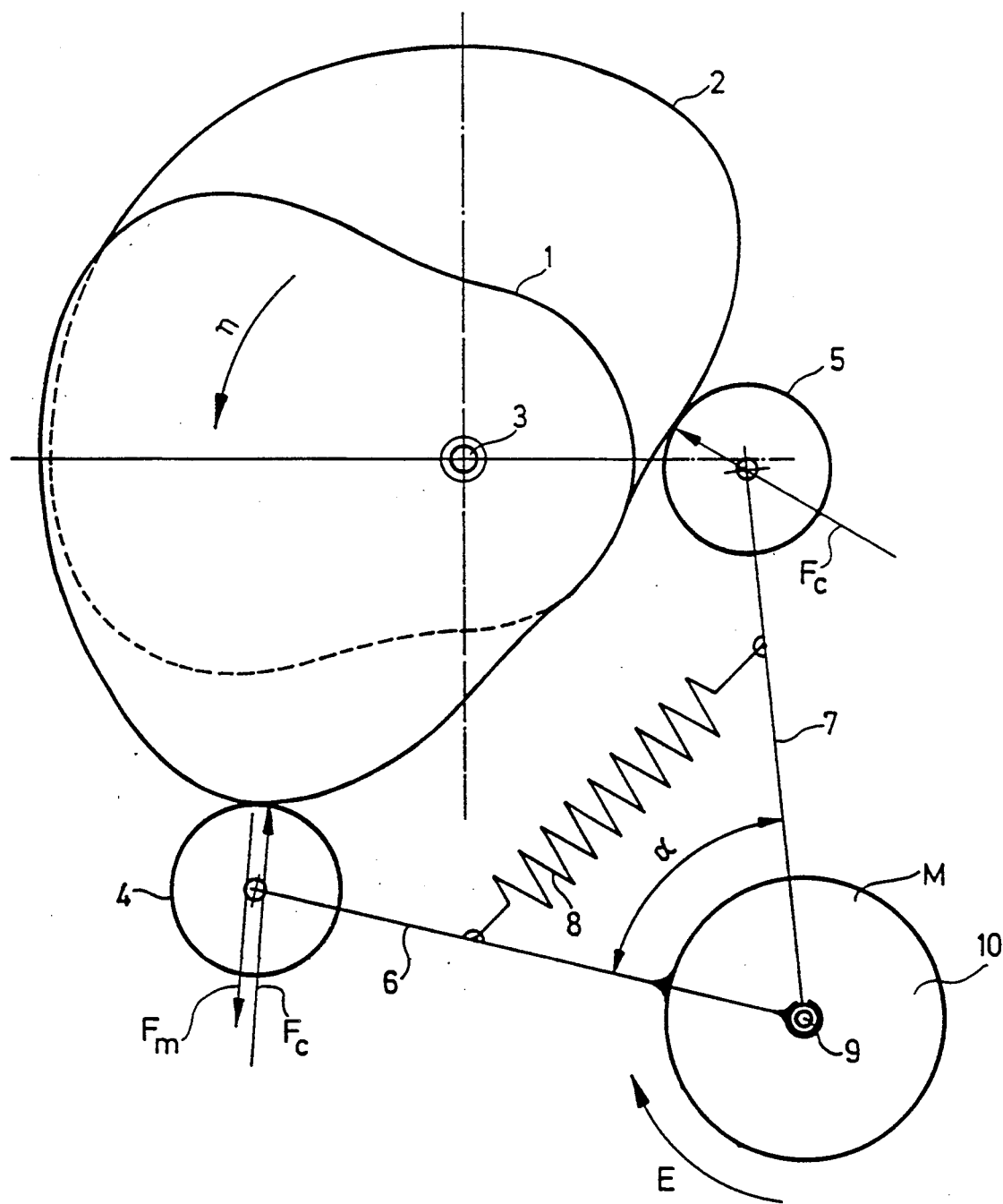
FIG. 2 is another view of FIG. 1 with the cam disks shown in a deceleration phase.

FIG. 2 shows the embodiment of FIG. 1 in a deceleration phase. In this regard, the inertial force Fm is directed away from the main cam 1, in the direction of a normal to the main cam 1, and consequently also directed in opposite direction with respect to the spring force Fc, which results in a reduction of the contact force of the roller 4 on the main cam 1. This reduction of the contact force can be compensated for by reinforcing the spring force Fc which is achieved by enlarging the angle α between the two roller levers 6 and 7. In this case, the corrected auxiliary cam 2 can be formed so as to exhibit a greater distance or spacing from the axis of rotation 3 of the two cams 1 and 2, as compared to an uncorrected course. By correspondingly extending the corrected auxiliary cam 2, the enlargement of the angle α formed between the two roller levers 6 and 7 can be varied.

A cam mechanism constructed in accordance with the principle illustrated in FIGS. 1 to 3 has a lever arrangement formed of the roller levers 6 and 7, the roller lever 6 being constructed as a swivel lever which is swivelable about a swivel axis 9 and by means of which a swiveling movement corresponding to the main cam 1 is impressed upon a swivel device.

In the embodiment according to FIG. 4, a roller lever 12 swivelable about a swivel axis 11 serves as such a swivel lever. As in the preceding embodiment, the rollers 4 and 5 and the swivel axis of the swivel lever (roller levers 6 and 12, respectively) have axes of symmetry extending parallel to one another, and normals to the axes of symmetry of the two rollers 4 and 5 intersecting one another on the axis of symmetry of the swivel axes 9 and 11, respectively, form an angle $\alpha$ representing a measure for the spring force Fc under which the two rollers 4 and 5 engage the two cams 1 and 2. FIG. 4 represents, moreover, an advantageous development of the invention in view of the inertial forces which have not yet been mentioned in connection with the second roller 5 which engages the auxiliary cam 2. As in the case of the embodiment according to FIGS. 1 to 3, the magnitude of the angle $\alpha$ is reduced during an acceleration phase of the roller 4 (FIGS. 1 and 3). Therewith also the spring force Fc is reduced under which the second roller 5 engages the auxiliary cam 2 while, simultaneously, an inertial force originating from the second roll 5 and its articulation means (roller lever 7 in FIGS. 1 to 3) attempts to lift the second roller 5 off the auxiliary cam 2.

In a further development of the subject matter of the invention according to FIG. 4, the action of the inertial force to lift the second roller 5 away from the auxiliary cam 2 is counteracted by locating the second roller 5 on a free end of a bending spring bar 13 so as to be rotatable, the other end of the spring bar 13 being secured under a pretensioning force to a hub 10 of the swivel lever 12, the hub 10 embracing the swivel axis 11.

The spring force Fc under which the two rollers 4 and 5 thereby engage the respective cams is provided by the pretensioning force. In contrast with a roller lever (roller lever 7 according to FIGS. 1 to 3) swivellable about an axis, the bending spring bar 13 can be constructed so as to have a relatively small mass; consequently, even in the case of a small spring force Fc, a reliable engagement of the second roller 5 with the auxiliary cam 2 is assured when the inertial forces associated with the second roller 5 attempt to lift the roller 5 off the auxiliary cam 2 while the first roller 4 engages the main cam 1 under a contact force reinforced by inertial forces.

We claim:

1. Cam mechanism for periodically swiveling a swivel device,
    a rotatable first cam disk carrying a first cam serving as a main cam,
    a rotatable second cam disk carrying a second cam serving as an auxiliary cam,
    a first roller engaging said first cam under spring force and rollable on said first cam during rotation of said first cam disk,
    a second roller engaging said second cam under spring force and rollable on said second cam during rotation of said second cam disk,
    and a lever arrangement swivelable by said two rollers and having at least one spring for providing said spring force, including a swivel lever swivelable about a swivel axis and carrying said first roller, a swiveling movement corresponding to said first cam being impressable by said swivel lever upon the swivel device, said swivel axis and said two rollers having axes of rotation extending parallel to one another, and normals to said axes of rotation of said two rollers intersecting one another on said axis of rotation of said swivel axis and forming an angle $\alpha$ which is a measure for the spring force under which said two rollers engage said two cams, said auxiliary cam having a contour for varying said angle $\alpha$ as a function of inertial forces resulting, respectively, from accelerations and decelerations of said lever arrangement and of machine parts connected therewith during rotation of said two cam disks.

2. Cam mechanism according to claim 1, wherein said contour of said auxiliary cam is shaped so as to vary said angle $\alpha$ in the sense of a constant contact force of said first roller on said first cam disk while being rotated.

3. Cam mechanism according to claim 2, wherein, in a region corresponding to said main cam, wherein the contact force of said first roller exceeds the spring force as a result of an acceleration of said first roller and of the machine parts connected therewith caused by said main cam, said auxiliary cam has a contour reducing said spring force.

4. Cam mechanism according to claim 3, wherein, in a region, corresponding to said main cam, wherein the contact force of said first roller exceeds the spring force as a result of an acceleration of said first roller and of the machine parts connected therewith caused by said main cam, said contour of said auxiliary cam is radially reduced by such an amount that a reduction of the spring force related thereto compensates for substantially an acceleration-caused portion of the contact force.

5. Cam mechanism for periodically swiveling a swivel device, a rotatable first cam disk carrying a first cam serving as a main cam, a rotatable second cam disk carrying a second cam serving as an auxiliary cam, a first roller engaging said first cam under spring force and rollable on said first cam during rotation of said first cam disk, a second roller engaging said second cam under spring force and rollable on said second cam during rotation of said second cam disk, and a lever arrangement swivelable by said two rollers and having at least one spring for providing said spring force, including a swivel lever swivelable about a swivel axis and carrying said first roller, a swiveling movement corresponding to said first cam being impressable by said swivel lever upon the swivel device, said swivel axis and said two rollers having axes of rotation extending parallel to one another, and normals to said axes of rotation of said two rollers intersecting one another on said axis of rotation of said swivel axis and forming an angle $\alpha$ which is a measure for the spring force under which said two rollers engage said two cams, said auxiliary cam having a contour for varying said angle $\alpha$ as a function of inertial forces resulting, respectively, from accelerations and decelerations of said lever arrangement and of machine parts connected therewith during rotation of said two cam disks, said second roller being rotatably disposed on a free end of a bending spring bar, said spring bar having another end secured under pretension force to a hub of said swivel lever, said hub embracing said swivel axis.

* * * * *